(12) United States Patent
Kurosaka et al.

(10) Patent No.: US 7,658,703 B2
(45) Date of Patent: Feb. 9, 2010

(54) METHOD OF PREVENTING EXPOSURE OF ASBESTOS-CONTAINING MATERIAL, METHOD OF TREATING ASBESTOS-CONTAINING WASTE MATERIAL, METHOD OF MELT TREATING ASBESTOS-CONTAINING WASTE MATERIAL, ASBESTOS-CONTAINING WASTE MATERIAL TREATED ARTICLE, AND ASBESTOS-CONTAINING MELT TREATED ARTICLE

(75) Inventors: Kazuya Kurosaka, Tokyo (JP); Takamaro Kano, Shizuoka (JP); Naoki Abe, Shizuoka (JP); Takeshi Narita, Shizuoka (JP)

(73) Assignee: Nichias Corporation, Tokyo (JP)

( * ) Notice: Subject to any disclaimer, the term of this patent is extended or adjusted under 35 U.S.C. 154(b) by 32 days.

(21) Appl. No.: 11/902,621

(22) Filed: Sep. 24, 2007

(65) Prior Publication Data
US 2008/0097136 A1 Apr. 24, 2008

(30) Foreign Application Priority Data
Sep. 29, 2006 (JP) .............................. 2006-266974
Jul. 12, 2007 (JP) .............................. 2007-183135

(51) Int. Cl.
*B09B 3/00* (2006.01)
(52) U.S. Cl. .................................... 588/254
(58) Field of Classification Search ................. 588/254, 588/252
See application file for complete search history.

(56) References Cited

U.S. PATENT DOCUMENTS
5,096,692 A * 3/1992 Ek .............................. 588/254
6,258,994 B1 * 7/2001 Jantzen et al. ................. 588/12

FOREIGN PATENT DOCUMENTS
| JP | A-62-237984 | 10/1987 |
| JP | A-03-021387 | 1/1991 |
| JP | A-09-110514 | 4/1997 |
| JP | A-2006-043620 | 2/2006 |
| JP | A-2006-063299 | 3/2006 |

* cited by examiner

*Primary Examiner*—John Kreck
(74) *Attorney, Agent, or Firm*—Oliff & Berridge, PLC

(57) ABSTRACT

The present invention relates to a series of techniques for treating a waste material of an asbestos-containing material, from emergency treatment, dismantling, or transportation of an already constructed asbestos-containing material to a heating and melting treatment of the dismantled asbestos-containing waste material. The preset invention provides a method of preventing the exposure of the fibrous dust of the asbestos involving melting an asbestos-containing waste material, into which lithium silicate is impregnated in a melting furnace for treating an asbestos-containing material into harmless. The lithium silicate impregnated into the asbestos-containing waste material forms a gel within the range of temperatures of 500 to 1,100° C., and the formed gel adheres onto the surfaces of asbestos fibers, thereby preventing the exposure of the fibrous dust of the asbestos. Moreover, the melting temperature of asbestos can be reduced to about 1,360° C.

4 Claims, 7 Drawing Sheets

100 μm

| | WITH A SEALANT (EXAMPLE) | WITH NO SEALANT (COMPARATIVE EXAMPLE) |
|---|---|---|
| 500°C | | |
| 1100°C | | |

100 μm

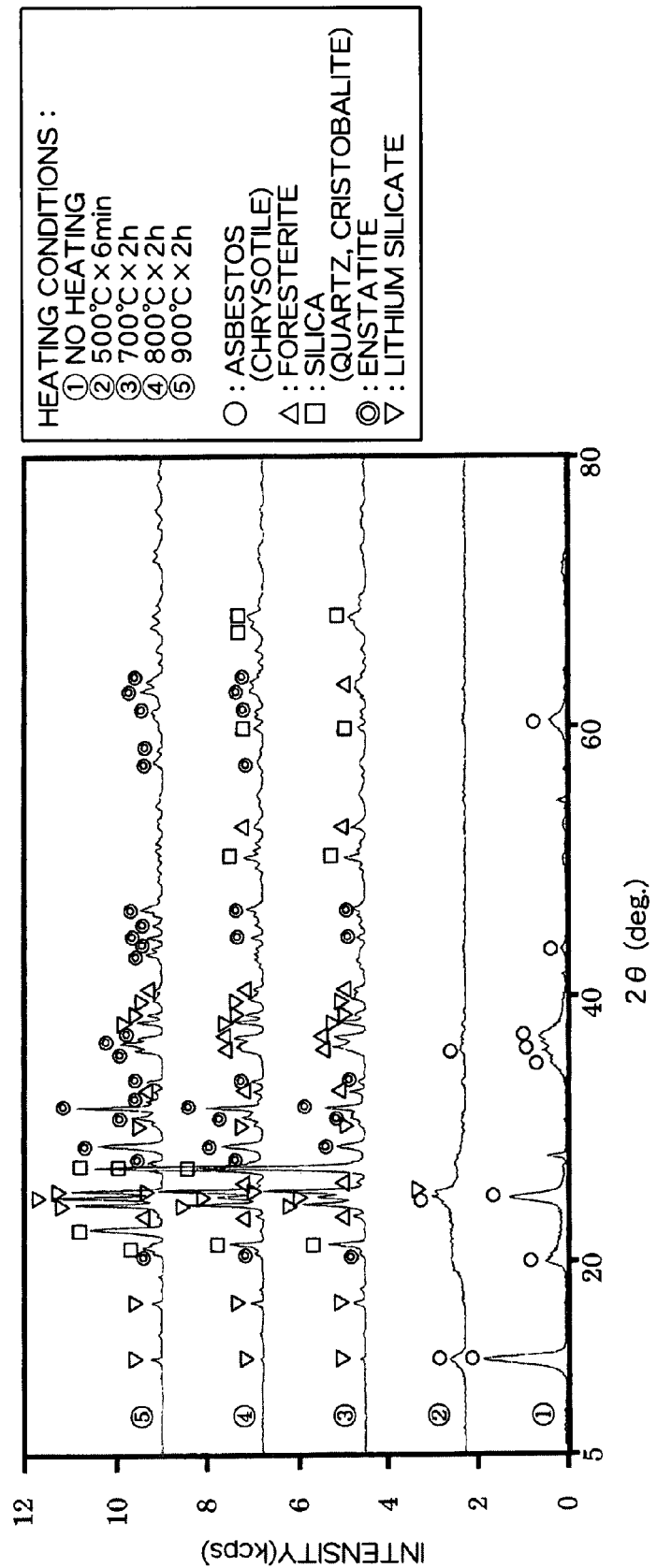

WITH A SEALANT
(EXAMPLE)

WITH NO SEALANT
(COMPARATIVE EXAMPLE)

METHOD OF PREVENTING EXPOSURE OF ASBESTOS-CONTAINING MATERIAL, METHOD OF TREATING ASBESTOS-CONTAINING WASTE MATERIAL, METHOD OF MELT TREATING ASBESTOS-CONTAINING WASTE MATERIAL, ASBESTOS-CONTAINING WASTE MATERIAL TREATED ARTICLE, AND ASBESTOS-CONTAINING MELT TREATED ARTICLE

CROSS-REFERENCE TO RELATED APPLICATIONS

The priority application numbers JP2006-266974 and 2007-183135 upon which this patent application is based are hereby incorporated by the reference.

BACKGROUND OF THE INVENTION

1. Field of the Invention

The present invention relates to techniques for preventing exposure of asbestos fibers, and melting and solidifying asbestos fibers. More specifically, according to the techniques, the exposure of the fibrous dust of the asbestos from an asbestos-containing material can be prevented at the time of dismantling already-constructed asbestos-containing materials (building materials, products, etc.), at the time of collecting and transporting the dismantled asbestos-containing materials, and at the time of melt treating the collected asbestos-containing material, and also the asbestos-containing materials can be melt treated at temperatures as low as 1,500° C. or less.

2. Description of the Related Art

Conventionally, products using asbestos are excellent in heat resistant properties, chemical resistant properties, and electrical insulation properties. Accordingly, the products using asbestos are used for various applications such as fire resistive covering materials including building materials, brake pads, etc. However, it is pointed out that when a human inhales exposed fibrous dust of the asbestos, they may suffer from serious diseases such as asbestosis pulmonum, lung cancer, or malignant mesothelioma, though the asbestos has the excellent physical and chemical properties.

At present, asbestos-containing industrial wastes are buried in final disposal sites. However, there is a limitation on the amount of the asbestos-containing industrial wastes capable of being disposed by burying, because the burying sites etc. are restricted. There have been proposed methods of preventing the exposure of the asbestos fibers from the asbestos-containing industrial wastes or methods of treating asbestos-containing industrial wastes into harmless materials.

For example, Japanese Patent Application Laid-open No. 62-237984 discloses a method of melt treating and solidifying asbestos-containing industrial wastes involving adding a melting aid such as an oxidized compound.

Japanese Patent Published Application No. 05-012994 discloses a method of treating asbestos-containing industrial wastes into harmless material involving treating the asbestos-containing industrial wastes with phosphoric acid, and then adding an alkali agent such as calcium carbonate.

Japanese Patent Application Laid-open No. 09-110514 discloses a method involving impregnating water into asbestos-containing wastes, adding sodium silicate or potassium silicate thereto to form a gel layer of an alkali silicate on the surfaces of fibers, and calcining and sintering at 1,000 to 1,200° C.

Japanese Patent Application Laid-open No. 2006-063299 discloses a method of preventing exposure of fibrous dust of asbestos involving impregnating a sealant at the time of dismantling asbestos building materials, or the like.

Japanese Patent Application Laid-open No. 2006-043620 discloses a method of melt treating asbestos-containing wastes involving impregnating a sealant into asbestos attached to a metal structure, and then packing the same in a storing container to be melt treated.

However, the methods disclosed in the above-mentioned documents have the following problems.

Japanese Patent Application Laid-open No. 62-237984 discloses a method involving crushing an asbestos waste material using a mixer, and then supplying a melting aid from a hopper for the purpose of melting and hardening the asbestos-containing waste material in such a manner that asbestos is vitrified or forms a harmless crystal at the time of melting. However, in this method, it is assumed that a melting aid is added to the asbestos-containing waste material in a closed space (mixer). Thus, it is not required for the selected melting aid to have an effect of preventing the exposure of the fibrous dust of the asbestos, and it is unclear whether such a melting aid has an effect of preventing the exposure of the fibrous dust of the asbestos.

Japanese Patent Published Application No. 05-012994 discloses a method involving mixing, by stirring, an asbestos-containing waste material and an aqueous phosphoric acid solution, and the like for granulating, followed by calcination, and further adding an alkali agent such as calcium carbonate, followed by calcination to form a granular material for the purpose of destroying a fiber structure of asbestos. However, in this method, it is assumed that wet blending is performed, which is clear from the fact that asbestos is mixed with an aqueous phosphoric acid solution, or the like, stirred, and granulated. In view of this, it is not required for such a chemical agent to have an effect of preventing the exposure of the fibrous dust of the asbestos, and it is unclear whether such a chemical agent has an effect of preventing the exposure of the fibrous dust of the asbestos.

In the method as described in Japanese Patent Application Laid-open No. 09-110514 involving adding sodium silicate or potassium silicate, and then calcinating and sintering, an asbestos-containing waste material is crushed and the resultant is mixed and kneaded with sodium silicate, or the like, for the purpose of treating the asbestos-containing industrial waste into harmless material for effective use. However, in this method, it is assumed that an asbestos-containing waste material is milled, and water is blended with sodium silicate etc., for curing. In view of this, the chemical agent is required to function as a curing agent, and is not required to have an effect of preventing the exposure of the fibrous dust of the asbestos. It is unclear whether the chemical agent has an effect of preventing the exposure of the fibrous dust of the asbestos.

In the method as disclosed in Japanese Patent Application Laid-open No. 2006-063299 involving preventing the exposure of the fibrous dust of the asbestos by impregnating a sealant, a silicon compound containing silicone and alkoxy silane is impregnated into the surface of an asbestos-containing material, followed by hardening, thereby preventing the exposure of the fibrous dust of the asbestos. However, since the method aims to prevent the exposure of the fibrous dust of the asbestos over a long period of time, a sealant is required to merely function as a exposure preventing agent. It is unclear whether an asbestos material can be melted at low temperatures using such a chemical agent.

In the method disclosed in Japanese Patent Application Laid-open No. 2006-043620 involving impregnating a sealant into asbestos attached to a metal structure, and packing the resultant into a storing container, the sealant is sprayed merely to prevent the exposure of the fibrous dust of the asbestos. Thus, it is unclear whether an asbestos-containing material can be melted at low temperatures using such a chemical agent.

The inventors of the present invention have carried out various studies and developments in view of the above-mentioned problems, and as a result, have found that the use of lithium silicate as a exposure preventing agent makes it possible to prevent the exposure of the fibrous dust of the asbestos and to melt an asbestos-containing material at temperatures as low as 1,500° C. or less, at the time of dismantling an already constructed asbestos-containing material, at the time of collecting and transporting the dismantled asbestos-containing material, and at the time of melting the collected asbestos-containing material. Based on this finding, the present invention has been accomplished.

SUMMARY OF THE INVENTION

A first aspect of the present invention relates to a method of preventing exposure of an asbestos-containing material, characterized by including impregnating 2 to 100% by weight of lithium silicate as a dry solid content into an asbestos-containing material. Note that, in this specification, the phrase "impregnating 2 to 100% by weight of lithium silicate as a dry solid content into an asbestos-containing material" refers to the fact that 2 to 100 parts by weight of lithium silicate as a dry solid content is impregnated into 100 parts by weight of an asbestos-containing material.

A second aspect of the present invention relates to a method of treating asbestos-containing waste material, characterized by including drying and solidifying the asbestos-containing material obtained by the method of preventing exposure of an asbestos-containing material, to form a waste material.

A third aspect of the present invention relates to a method of melt treating the asbestos-containing waste material, characterized by including further melt treating of the asbestos-containing waste material obtained by the method of treating asbestos-containing waste material.

A fourth aspect of the present invention relates to an asbestos-containing waste material treated article, which is obtained by the method of treating asbestos-containing waste material.

A fifth aspect of the present invention relates to an asbestos-containing melt treated article, which is obtained by the method of melt treating the asbestos-containing waste material.

According to the present invention, the following effects may be obtained.

(1) Asbestos has a low affinity for water, and therefore, even when water is sprayed at the time of dismantling the asbestos-containing product, an effect of preventing the exposure of the fibrous dust of the asbestos is low. In contrast, lithium silicate has a high affinity with asbestos, and therefore when an aqueous lithium silicate solution is sprayed at the time of dismantling the asbestos-containing product, an effect of preventing the exposure of fibrous dust of the asbestos at the time of dismantling the asbestos-containing product is high. This is based on the following reasons.

The aqueous lithium silicate solution includes colloidal silica whose surface charge is negative and a positively charged lithium ion that are electrically balanced.

Of the asbestos, crocidolite and amosite each have negative surface charge, which is the same as the surface charge of silicic acid (colloidal silica) in the aqueous lithium silicate solution. Therefore, when an aqueous lithium silicate solution is coated to an aggregation of asbestos fibers such as a spraying material, the surface charge of asbestos fibers is repulsive to the surface charge of the colloidal silica in the aqueous solution, resulting in that asbestos fibers and the colloidal silica are dispersed. However, the balance therebetween is maintained by lithium ion and thus the affinity with asbestos fibers is presumably high (being wet).

Since the asbestos fiber surfaces are being wet with lithium silicate, asbestos fibers are difficult to be exposed. When the surfaces are dried while maintaining this state, colloidal silica is hardened with asbestos fibers, thereby keeping the effect of preventing the exposure of the fibrous dust of the asbestos even after drying.

As a material exhibiting such effects, other alkali silicates may be listed. Actually, all the aqueous solutions of alkali silicate have a favorable wettability to asbestos fibers, and have an effect of preventing the exposure of the fibrous dust of the asbestos.

However, since the ionic radius of lithium ion is smaller than that of other alkalis, a large amount of lithium ions can adsorb onto the surfaces of asbestos fibers. Accordingly, the affinity of lithium ion with the asbestos presumably becomes highest among the various materials mentioned above, and therefore the lithium ion is the most effective for preventing the exposure of the asbestos fiber.

(2) When asbestos-containing waste materials, into which an aqueous lithium silicate solution is impregnated, are dried, and then the asbestos-containing waste material is melted by heat, the lithium silicate impregnated into the asbestos-containing waste material forms a gel within the range of temperatures of 500 to 1,100° C. The formed gel adheres to the surfaces of asbestos fibers for preventing the exposure of the fibrous dust of the asbestos at the time of melting by heat (asbestos fiber can be confined). Moreover, the temperature at which the melting of asbestos is completed, which is usually 1,500° C. or higher, can be lowered to about 1,360° C. at the maximum.

This is because the phase equilibrium state changes with the addition of $Li_2O$ in the lithium silicate. The change is shown in FIG. 10. FIG. 10 is a diagram illustrating the phase equilibrium state of $Li_2O$ and $SiO_2$, and shows that the melting temperature is lowered as the proportion of $Li_2O$ becomes higher.

For example, FIG. 10 shows that when lithium silicate ($SiO_2:Li_2O$ molar ratio=3.5:1) is impregnated into chrysotile ($Mg_6Si_4O_{10}(OH)_8$) in a manner so as to be 1:1 (weight ratio), the $Li_2O:SiO_2$ molar ratio of the resultant mixture is 14:86, and the melting point at this time is theoretically about 1380° C.

(3) When the asbestos-containing waste materials including asbestos chrysotile (chrysotile), to which lithium silicate is adhered, are heated to 700° C. or higher, the structures of the asbestos-containing waste materials are each converted into a crystal structure of forsterite, silica, and enstatite. When the asbestos-containing waste materials are heated to 900° C. or higher, silica and enstatite crystals become main structures and forsterite crystals almost disappear. There is a possibility that forsterite will be hydrated to return to chrysotile over a long period of time, and thus this treating method provides a higher level of safety.

(4) By impregnating an asbestos-containing waste material with an aqueous lithium silicate solution, lithium silicate hardens, which prevents the exposure of the fibrous dust of the asbestos from the asbestos-containing waste material. Moreover, deliquescing and fluidizing of the asbestos-containing waste materials are avoided. Accordingly, if required, it is also possible to prevent the exposure of the fibrous dust of the asbestos over a long period of time without reducing the force of confining asbestos fibers. Moreover, among alkaline substances, since the pH of lithium silicate is relatively low, the safety during operations is high, and a treatment site is difficult to erode.

BRIEF DESCRIPTION OF THE DRAWINGS

FIG. 7 is an XRD chart of an asbestos-containing waste material, to which a sealant is applied.

DESCRIPTION OF THE PREFERRED EMBODIMENTS

Figure 1A:
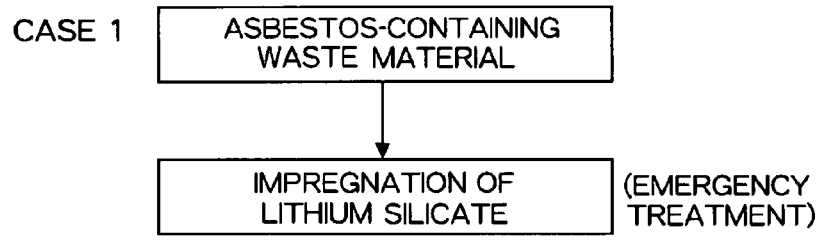
FIG. 1A is a flowchart illustrating case 1 of a first embodiment of the present invention.

According to a first embodiment of the present invention, a method of preventing the exposure of the fibrous dust of the asbestos will be described. In Case 1 shown in FIG. 1A, an aqueous solution of lithium silicate is impregnated into an asbestos-containing material constructed on an already constructed building, and the like, followed by drying, thereby preventing the exposure of the fibrous dust of the asbestos from the asbestos-containing material.

Figure 1B:
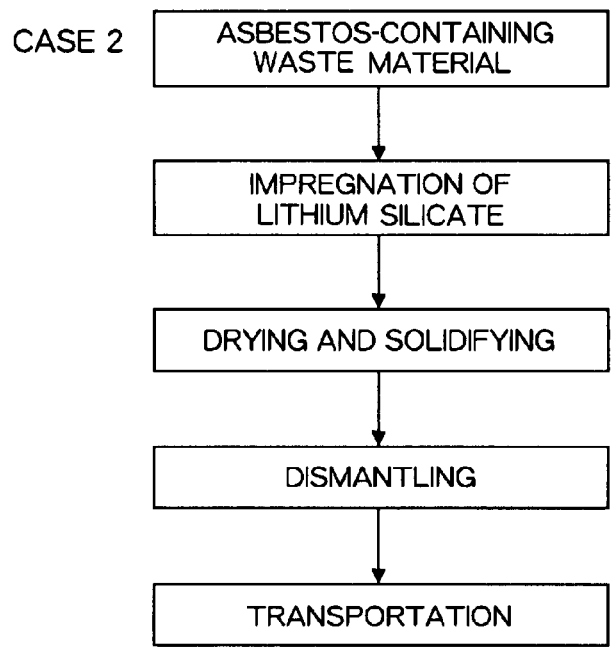
FIG. 1B is a flowchart illustrating case 2 of a first embodiment of the present invention.

In Case 2 shown in FIG. 1B, an aqueous solution of lithium silicate is impregnated into an asbestos-containing material constructed on an already constructed building, and the like, followed by drying and solidifying. Then, the already constructed building is dismantled together with the asbestos-containing waste material which is treated so as not to be exposed, and transported from a construction site, and buried or the like.

Here, by way of example, a heat insulating material for funnels ("trade name: capo stack" manufactured by NICHIAS CORP.) is used as an asbestos-containing material, a process for impregnating an aqueous lithium silicate solution for preventing the exposure of the fibrous dust of the asbestos will be described below.

Figure 2:
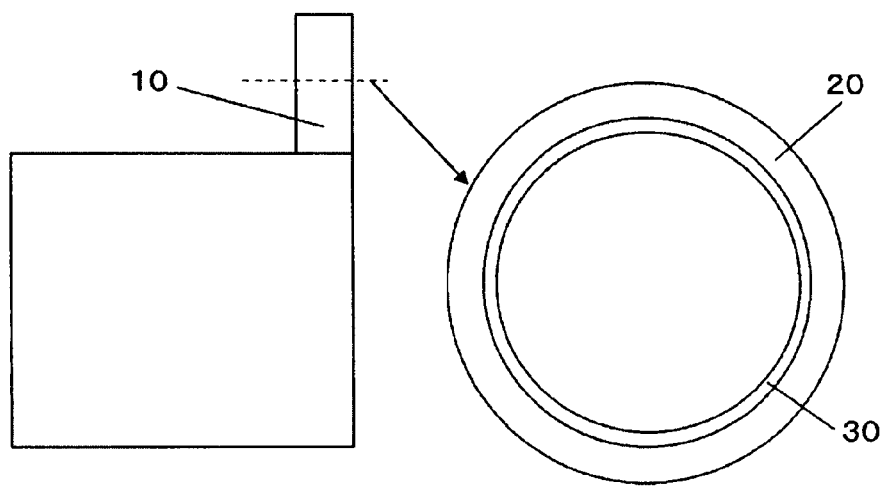
FIG. 2 is an explanatory diagram illustrating a heat insulating material for a funnel as an asbestos-containing material.

First, as shown in FIG. 2, the heat insulating material for funnels, which is an asbestos-containing material, is a felt-like heat insulating material for use in a heat insulating layer 20 and a lining layer 30 constructed inside a funnel 10 for use in a boiler or an electric generator installed in buildings.

An aqueous lithium silicate solution is poured into the heat insulating material for funnels (asbestos-containing material). At this time, the aqueous lithium silicate solution is poured in such a manner that 2 to 100% by weight (dry solid content) of lithium silicate is impregnated, based on the weight of the heat insulating material for funnels. After that, the aqueous lithium silicate solution is dried, and the dry solid matter of lithium silicate adheres to the heat insulating material for funnels to be solidified, thereby preventing the exposure of the fibrous dust of the asbestos.

In both the above-mentioned Cases 1 and 2, the lithium silicate adhering to the asbestos-containing material has high affinity with asbestos, and does not deliquesce nor fluidize. Thus, there is an advantage in that asbestos fibers contained in the asbestos-containing material may be confined over a long period of time to prevent the exposure of the fibrous dust of the asbestos. Moreover, the lithium silicate is closer to neutrality than sodium silicate and potassium silicate. Accordingly, the lithium silicate provides a worker with a higher level of safety during operation, and does not erode already constructed buildings and the like.

Figure 3:
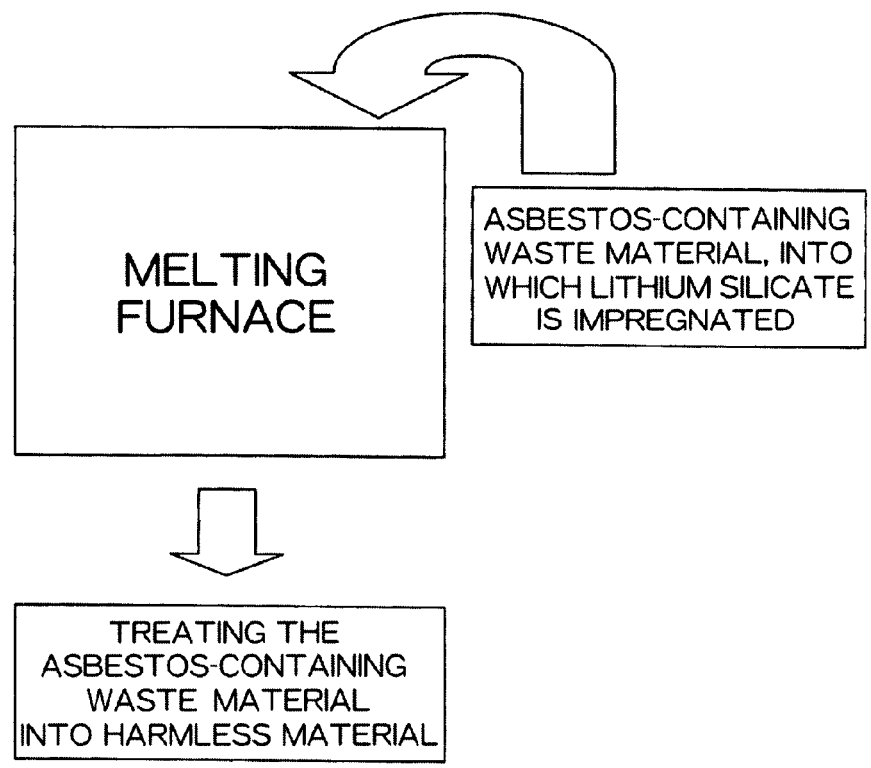
FIG. 3 is a conceptual diagram illustrating a second embodiment of the present invention.

Next, as shown in FIG. 3, according to a second embodiment of the present invention, a method will be described, which includes impregnating an aqueous lithium silicate solution into an asbestos-containing material, followed by drying, and melting the asbestos-containing waste material which is treated so as not to be exposed in a melting furnace, thereby treating the asbestos-containing waste material into harmless material. Note that the process for impregnating an aqueous lithium silicate solution into an asbestos-containing material is described above, and thus the description is omitted.

An asbestos-containing material, into which an aqueous lithium silicate solution is impregnated, is heated at 100° C. or higher for about 3 hours for drying, and the resultant is used as an asbestos-containing material, to which solid matter of lithium silicate is adhered. After that, the asbestos-containing waste material is put in a melting furnace, and a temperature is raised to about 1,500° C. for melting the asbestos-containing waste material.

The lithium silicate adhering to the asbestos-containing waste material in the melting furnace forms a gel within the range of temperatures of 500 to 1,100° C., and the formed gel adheres onto the surfaces of asbestos fibers, thereby preventing the exposure of the fibrous dust of the asbestos.

Moreover, 2 to 100% by weight (dry solid content) of an aqueous lithium silicate solution is impregnated into an asbestos-containing waste material, thereby making it possible to reduce the melting temperature of asbestos, which is generally 1500° C. or higher, to about 1360° C.

According to the Asbestos Problem Prevention Regulations in Japan, when dismantling exposable asbestos building materials and the like, it is obliged to perform a treatment for preventing the exposure of the fibrous dust of the asbestos. Moreover, according to the Act of Disposal of Waste Matter (Japan), in order to render asbestos-containing waste materials into harmless material, it is encouraged to melt the asbestos-containing waste materials at 1500° C. or higher, and fibers of waste materials that are put into a melting furnace are required not to scatter until immediately before the melting temperature.

When an asbestos-containing waste material, into which lithium silicate is impregnated, is melted by heat, the following effects can be obtained.

(1) When a exposure preventing agent consisted of resin as a principal component is used, a temperature for confining asbestos fibers is limited to about 400° C. Compared with this, lithium silicate can confine asbestos fibers within a high-temperature range up to about 1,100° C. This is because, when the exposure preventing agent consisted of a resin as a principal component is used, a sealant is burned down by heating, but lithium silicate is vitrified without being burned down even if it is heated, and thus can confine asbestos at high temperatures. Therefore, in the melting treatment of asbestos fibers, the possibility of the exposure of the fibrous dust of the asbestos can be made extremely low.

(2) Heat melting furnaces have various structures. Some heat melting furnaces have a structure where an input port of the melting furnace is not sealed with a lid, or the like. In the case of the use of such a heat melting furnace, the exposure of the fibrous dust of the asbestos is not always sufficiently prevented during raising of a temperature in a process until an asbestos-containing waste material is melted. However, by the use of an aqueous lithium silicate solution as a exposure preventing agent, preventing the exposure of the fibrous dust of the asbestos at the time of raising the temperature became possible.

(3) The melting temperature of an asbestos-containing waste material has so far been defined as 1,500° C. However, since this melting temperature can be reduced to about 1,360° C. by using lithium silicate, the amount of energy for melting asbestos-containing waste materials can be reduced.

EXAMPLES

Next, Examples of the present invention will be described.

Figure 4:
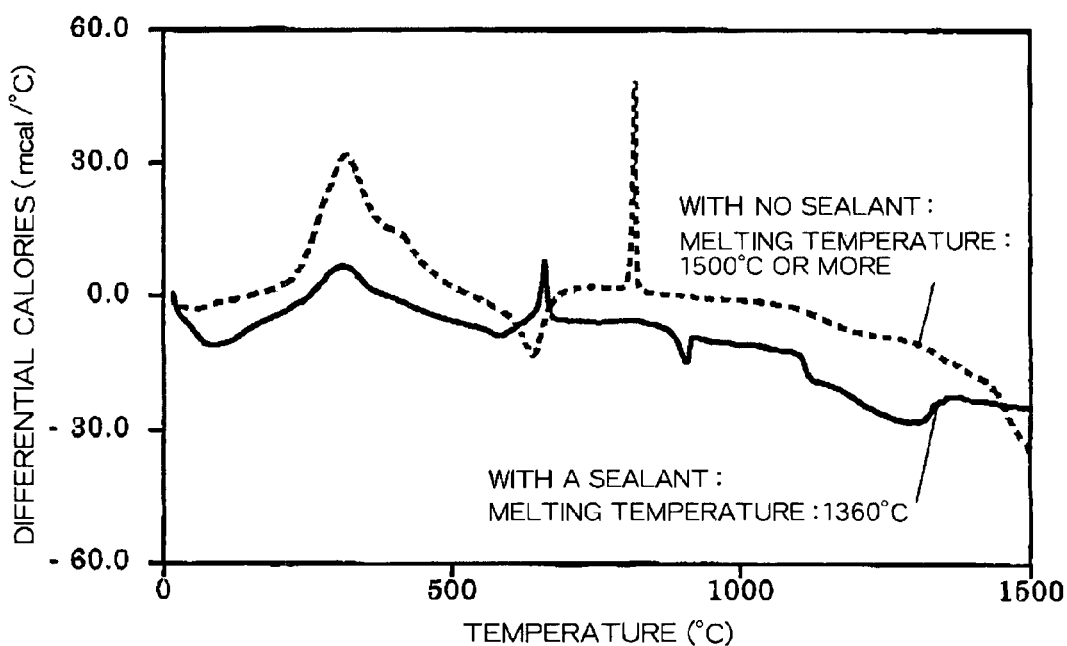
FIG. 4 is a DSC chart of asbestos which is impregnated with an aqueous lithium silicate solution.

FIG. 4 illustrates a DSC (Differential Scanning Calorimetry) chart from room temperature to 1500° C. with respect to an asbestos-containing material into which an aqueous lithium silicate solution is impregnated as a exposure preventing agent (Example) and an asbestos-containing material without sealant (Comparative Example). The solid line shows Example and the dashed line shows Comparative Example.

Regarding Example

Figures 5, 6:
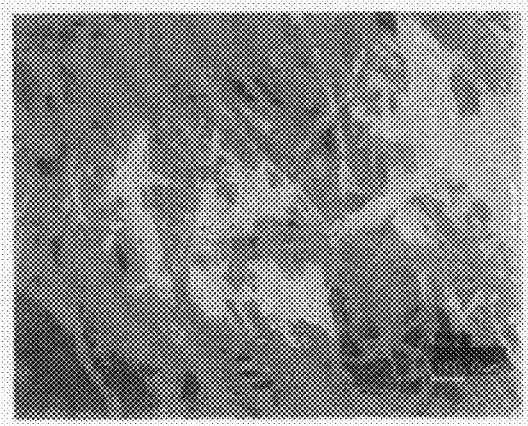
FIG. 5 shows an asbestos-containing waste material used as a sample.
FIG. 6 shows asbestos-containing waste materials heated to 500° C. and 1,100° C.

As an asbestos-containing material, a sprayed material including asbestos chrysotile (chrysotile) in a proportion of about 100% by weight was used (FIG. 5). The thickness of the sprayed material was 2 to 3 mm, and had been constructed on a roof of a building. The surface of the sprayed material was coated with a exposure preventing agent consisted of an organic material at the time of dismantling.

An aqueous lithium silicate solution in which the dry solid content of lithium silicate was 26% by weight and the molar ratio of $SiO_2$ to $Li_2O$ was 3.5 in an aqueous solution was impregnated by spraying into an asbestos-containing waste material of about 75×75 mm in such a manner that about 100% by weight of the aqueous lithium silicate solution is adhered onto the asbestos-containing material. Thereafter, the asbestos-containing material was dried at 105° C. for about 3 hours. After drying, when the front surface and the rear surface of the asbestos-containing material were observed, it was found that the solid material of lithium silicate precipitated and covered asbestos fibers. The dried body was heated at 500° C. for 6 minutes and at 1,100° C. for 3 minutes, and the appearance was observed. Within the range of temperatures of 500° C. to 1,100° C., a gel-like solid precipitated and the entire gel-like solid was stiffened. When the gel-like solid was observed with a microscope, the white gel-like matter still firmly covered fibers (FIG. 6), and deflux-ion of the gel was not found. Therefore, it was found that exposure of fibers was inhibited until at least 1100° C. Moreover, when the asbestos-containing material, to which a sealant was applied, was subjected to a differential scanning calorimetric analysis, it was revealed that the melting of the material was completed at about 1360° C. (see FIG. 4).

Furthermore, the asbestos-containing waste material was heated at about 700° C., 800° C., and 900° C. for 2 hours, respectively and the changes in the crystal phases were observed. FIG. 7 shows that although asbestos (chrysotile) slightly remained when heated at 500° C. for 6 minutes, formation of lithium silicate was observed. Thus, it was found that the material covering fibers shown in FIG. 6 was lithium silicate. When the heating temperature was further raised, crystals of asbestos (chrysotile) were not detected when heated at 700° C. or higher, and foresterite, silica, and enstatite besides lithium silicate were observed. When heated at 900° C., most compounds other than lithium silicate were silica and enstatite, and foresterite was only slightly detected.

This is presumably caused by the following reactions.

$2Mg_3Si_2O_5(OH)_4 \rightarrow 3Mg_2SiO_4 + SiO_2 + 4H_2O$ (Formula 1)

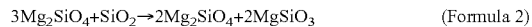
$3Mg_2SiO_4 + SiO_2 \rightarrow 2Mg_2SiO_4 + 2MgSiO_3$ (Formula 2)

$3Mg_2SiO_4 + 3SiO_2 43\ 6MgSiO_3$ (Formula 3)

In the above-mentioned formulae, $Mg_3Si_2O_5(OH)_4$ is asbestos, $Mg_2SiO_4$ is foresterite, $SiO_2$ is silica, and $MgSiO_3$ is enstatite.

Normally, the reaction of Formula 1 proceeds by heating asbestos, and the reaction of Formula 2 proceeds by further heating. In Formula 1, 1 mol of silica is formed based on 2 mol of asbestos. In Formula 2, the reaction which consumes this silica proceeds and the same moles of foresterite and enstatite are formed. Since an aqueous solution of lithium silicate was used as a sealant in the Example of the present invention, supplying silica components presumably caused the reaction mainly close to the reaction represented by Formula 3. Moreover, the reactions of Formula 1 and Formula 2 generally occur at 800 to 950° C. and 1000 to 1200° C., respectively. In the Example of the present invention, it was presumed that the reaction of Formula 2 mainly occurred at temperatures of 700° C. or higher and the reaction of Formula 3 mainly occurred at temperatures of 900° C. or higher. This was presumably because lithium silicate formed a gel and the formed gel covered the asbestos surface, thereby increasing the reaction area between asbestos and silica.

Figure 8A:
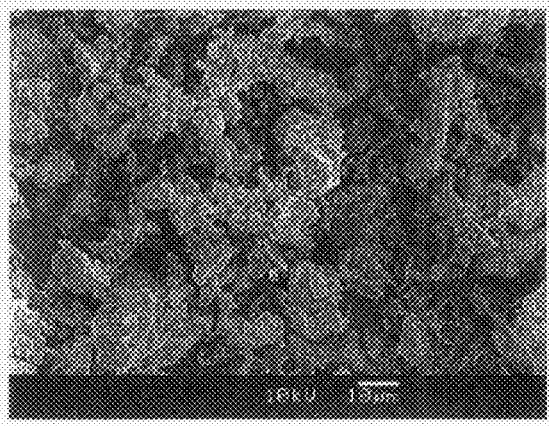
FIG. 8A shows an asbestos-containing waste material comprising a sealant heated at 900° C., and then crushed in a mortar.

An asbestos-containing material (asbestos-containing waste material), to which a sealant was applied and heated at 900° C., became extremely brittle compared with an unheated asbestos-containing material (asbestos-containing waste material). When fibrous materials observed inside the gel material were crushed with a mortar, the fibrous materials were easily crushed and disappeared (FIG. 8A).

Regarding Comparative Example

As an asbestos-containing material, a sprayed material including asbestos chrysotile (chrysotile) in a proportion of about 100% by weight, which had been constructed for a roof of a building, and which was applied with an organic exposure preventing agent at the time of dismantling, was used. When the asbestos-containing material was dried and calcined under the same conditions as in the above-mentioned Example without impregnating an aqueous lithium silicate solution, the entire surface became black when heated to 500° C. The black product covered the surfaces of asbestos fibers, but the force of confining asbestos was low and asbestos fibers were not confined. When the resultant was further heated at 1100° C. for 3 minutes, asbestos fibers became brittle and was likely to fracture, and also entanglement of the fibers became loose and the fibers were likely to be exposed (FIG. 6). Therefore, it was found that there was a possibility that exposure of asbestos fibers might occur at the time of heating, even if a exposure preventing agent consisted of an organic component was applied. Moreover, when a waste material, to which a sealant was not applied, was subjected to a differential scanning calorimetric analysis, it was found that the temperature at which the melting was completed was about 1500° C. or higher (see FIG. 4).

Figure 9:
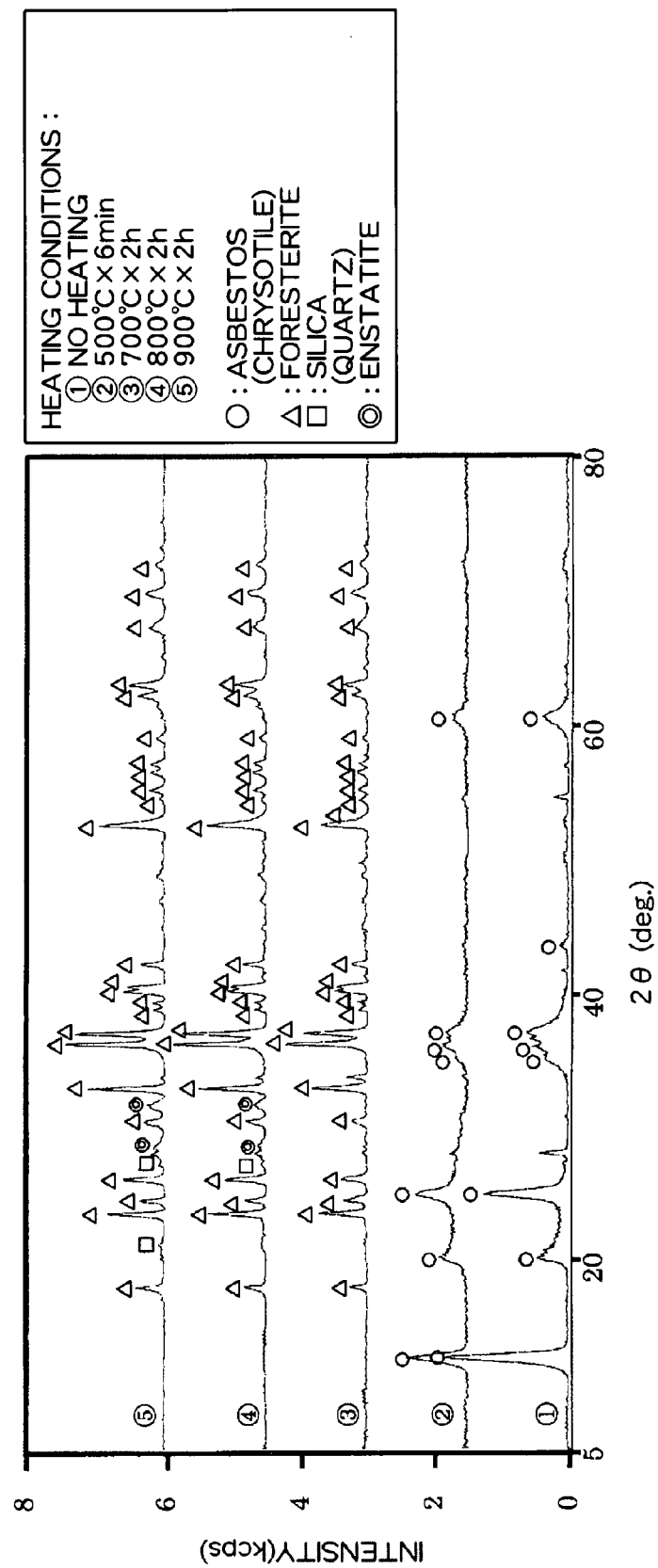
FIG. 9 is an XRD chart of an asbestos-containing waste material to which a sealant is not applied.
Figure 10:
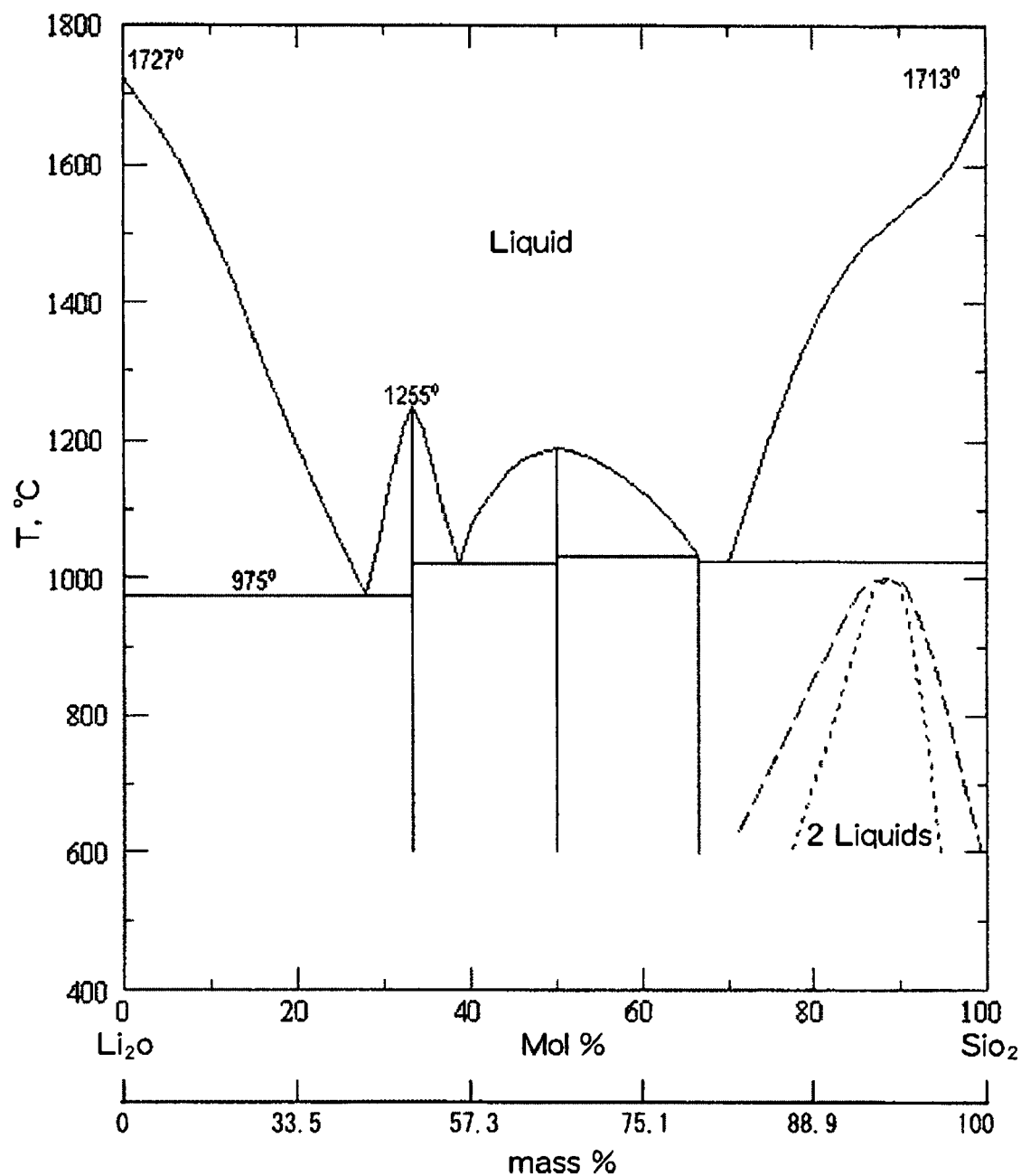
FIG. 10 is diagram illustrating an $Li_2O$—$SiO_2$ phase equilibrium state.

Subsequently, the asbestos-containing waste material was heated at about 700° C., 800° C., and 900° C. for 2 hours, respectively and the changes in the crystal phases were observed. FIG. 9 shows that asbestos (chrysotile) was hardly changed when heated at 500° C. for 6 minutes. When the heating temperature was further raised, crystals of asbestos (chrysotile) were no longer detected when heated at 700° C. or higher, and foresterite, silica, and enstatite were formed. When heated at 900° C., foresterite was mainly detected and silica and enstatite were slightly detected.

This was presumably because, unlike the example, no silica components were supplied from the outside and thus the reactions of Formula 1 and Formula 2 mentioned above mainly occurred.

Figure 8B:
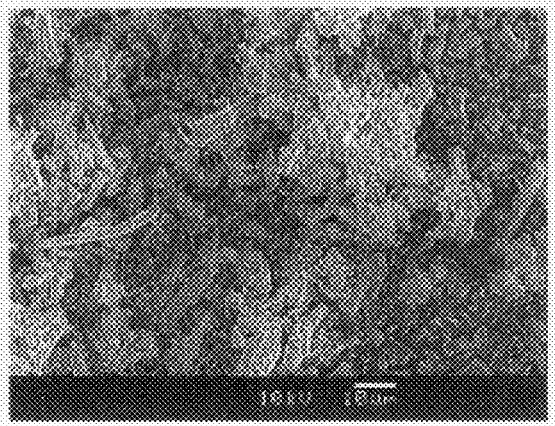
FIG. 8B shows an asbestos-containing waste material comprising no sealant heated at 900° C., and then crushed in a mortar.

Furthermore, when the asbestos-containing material (asbestos-containing waste material) was heated at 900° C. it became extremely brittle compared with an unheated asbestos-containing material, but the fibrous materials were observed inside. Then, when the resultant was crushed in a mortar, the fibrous materials remained (FIG. 8B).

The present invention can be widely used in cases where the asbestos-containing material is treated at room temperature (emergency treatment, dismantling, transportation, or the like) and in cases where temperatures are raised, i.e. in cases where the heat melting treatment of the asbestos-containing material is carried out. Moreover, the present invention can also be widely used as structures for preventing the exposure of the fibrous dust of the asbestos from the asbestos-containing material.

What is claimed is:

1. A method of melt treating an asbestos-containing waste material, comprising:
   melt treating of the asbestos-containing waste material obtained by a method including:
      impregnating 2 to 100% lithium silicate as a dry solid content into an asbestos-containing material; and
      drying and hardening the asbestos-containing material to form the asbestos-containing waste material.

2. The method according to claim 1, wherein the melt treating of the asbestos-containing waste material includes heating the asbestos-containing waste material at a temperature above a melting temperature of asbestos.

3. The method according to claim 2, wherein the impregnating the asbestos-containing waste material lowers the melting temperature of asbestos to about 1360° C.

4. The method according to claim 3, wherein the heating the asbestos-containing waste material is at about 1500° C. or below.

\* \* \* \* \*